United States Patent
Taylor et al.

(10) Patent No.: US 10,728,494 B2
(45) Date of Patent: Jul. 28, 2020

(54) DIFFERENTIAL TRANSFORMATION OF VIDEO

(71) Applicant: Disney Enterprises, Inc., Burbank, CA (US)

(72) Inventors: Christopher S. Taylor, La Canada, CA (US); Steven M. Chapman, Newbury Park, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/437,329

(22) Filed: Feb. 20, 2017

(65) Prior Publication Data

US 2018/0241965 A1 Aug. 23, 2018

(51) Int. Cl.
*H04N 7/01* (2006.01)
*H04N 7/015* (2006.01)
*H04N 21/44* (2011.01)
*H04N 21/4402* (2011.01)
*H04N 21/2343* (2011.01)
(Continued)

(52) U.S. Cl.
CPC ............ *H04N 7/0117* (2013.01); *G06T 3/40* (2013.01); *H04N 7/0125* (2013.01); *H04N 21/2343* (2013.01); *H04N 21/23418* (2013.01); *H04N 21/234345* (2013.01); *H04N 21/234363* (2013.01); *H04N 21/4402* (2013.01); *H04N 21/44008* (2013.01); *H04N 21/440245* (2013.01); *H04N 21/440263* (2013.01)

(58) Field of Classification Search
CPC .................................................. H04N 7/0117
USPC ........................................................ 348/441
See application file for complete search history.

(56) References Cited

U.S. PATENT DOCUMENTS 5,703,604 A 12/1997 McCutchen
5,760,827 A 6/1998 Paris
(Continued)

FOREIGN PATENT DOCUMENTS

CN 105741233 7/2016
WO WO2016064862 4/2016

OTHER PUBLICATIONS

Feng, et al. "Online Content-aware Video Condensation." Jun. 2012, pp. 1-6, Proceedings of IEEE Conference on Computer Vision and Pattern Recognition. Providence, Rhode Island, USA.
(Continued)

*Primary Examiner* — Jefferey F Harold
*Assistant Examiner* — Justin B Sanders
(74) *Attorney, Agent, or Firm* — Farjami & Farjami LLP

(57) ABSTRACT

According to one implementation, a system for differentially transforming video content includes a computing platform having a hardware processor and a system memory storing a video reformatting software code. The hardware processor executes the video reformatting software code to receive an input video file including video content formatted for a first set of coordinates, and to detect one or more principle features depicted in the video content based on a predetermined principle feature identification data corresponding to the video content. The hardware processor further executes the video reformatting software code to differentially map the video content to a second set of coordinates to produce a reformatted video content. The resolution of the one or more principle features is enhanced relative to other features depicted in the reformatted video content.

14 Claims, 6 Drawing Sheets

(51) Int. Cl.
  *H04N 21/234* (2011.01)
  *G06T 3/40* (2006.01)

(56) References Cited

U.S. PATENT DOCUMENTS

| | | | |
|---|---|---|---|
| 6,141,034 | A | 1/2000 | McCutchen |
| 6,320,584 | B1 | 11/2001 | Golin |
| 6,778,211 | B1 | 8/2004 | Zimmermann |
| 7,436,405 | B2 | 10/2008 | Losasso Petterson |
| 8,902,322 | B2 | 12/2014 | Ramsay |
| 2010/0299630 | A1 | 11/2010 | McCutehen |
| 2012/0206565 | A1 | 8/2012 | Villmer |
| 2012/0243742 | A1* | 9/2012 | Sato ............... G06K 9/00281 382/103 |
| 2013/0312042 | A1* | 11/2013 | Shaw ............... H04N 21/23439 725/62 |
| 2015/0178986 | A1* | 6/2015 | Schpok ............... G06T 17/05 345/420 |
| 2016/0112489 | A1 | 4/2016 | Riley |
| 2016/0142744 | A1* | 5/2016 | Hirota ............... H04N 21/23614 725/54 |
| 2017/0018088 | A1* | 1/2017 | Jeong ............... G06T 15/04 |
| 2017/0019633 | A1* | 1/2017 | Shaburov ............... G06K 9/00711 |
| 2017/0123054 | A1* | 5/2017 | Becker ............... G01S 7/51 |

OTHER PUBLICATIONS

Achanta, et al. "Saliency Detection for Content-Aware Image Resizing." Nov. 2009, pp. 1-4, ICIP'09 Proceedings of the 16th IEEE International Conference on Image Processing, Cairo, Egypt.

Lindberg, Brett D. "Panoramic Augmented Reality for Persistence of Information in Counterinsurgency Environments (PARPICE)." Dec. 2010, pp. 1-128. Calhoun: The NPS Institutional Archive, Monterey, California, USA.

Corbillon, et al. "Viewport-Adaptive Navigable 360-Degree Video Delivery." Sep. 2016, pp. 1-7, IEEE ICC, 2017.

Wikipedia Contributors, "Equirectangular Projection." *Wikipedia, The Free Encyclopedia*. Wikipedia, The Free Encyclopedia. Jan. 6, 2017. Web. May 22, 2017. <https://en.wikipedia.org/w/index.php?title=Equirectangular_projection&oldid=758590407>.

* cited by examiner

US 10,728,494 B2

DIFFERENTIAL TRANSFORMATION OF VIDEO

BACKGROUND

Video content may be reformatted and/or compressed in a variety of ways. For example, spherical video is often represented as a projection onto rectangular frames. A commonly used projection technique for spherical video is referred to as equirectangular projection or latitude/longitude projection. According to that approach, each pixel within the rectangular frame represents a latitudinal and longitudinal coordinate from the projected sphere. In addition, a linear scaling is typically used for both the latitudinal and longitudinal coordinates, which results in features shown in the northernmost and southernmost latitudes of a spherical video frame being disproportionately emphasized in the corresponding rectangular frame.

SUMMARY

There are provided systems and methods for differentially transforming video, substantially as shown in and/or described in connection with at least one of the figures, and as set forth more completely in the claims.

DETAILED DESCRIPTION

Figure 1:
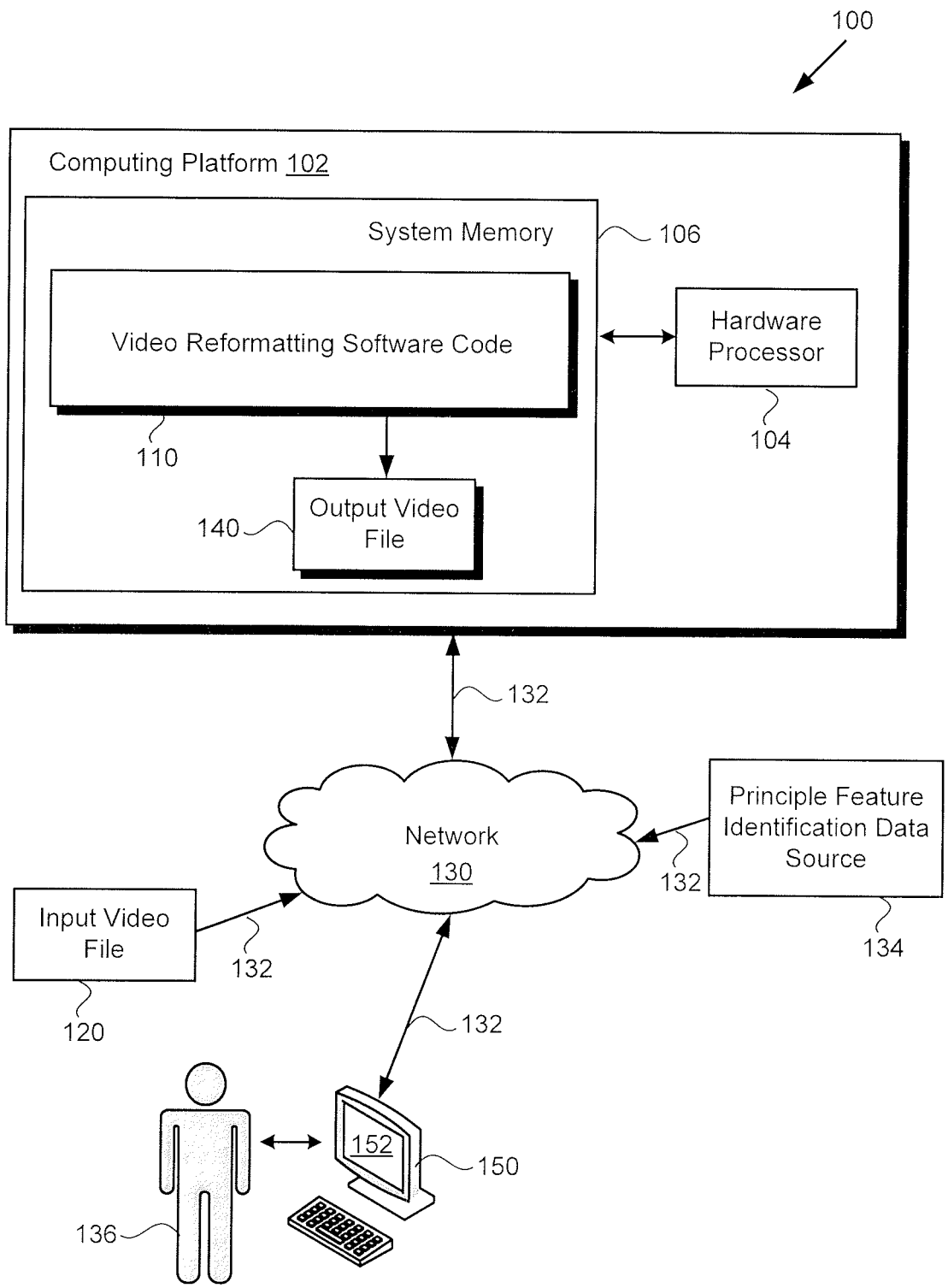
FIG. 1 shows a diagram of an exemplary system for differentially transforming video, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a solution for differentially transforming video content that addresses and overcomes the deficiencies in the conventional art by enabling the selective emphasis of features predetermined to be principle features of video content during its reformatting. By differentially mapping the video content so as to enhance the resolution of those principle features relative to other features shown in the reformatted video content, the present solution advantageously emphasizes features that are likely to be important to viewers, regardless of their location in the original video image.

FIG. 1 shows a diagram of one exemplary implementation of a system for differentially transforming video. As shown in FIG. 1, system 100 includes computing platform 102 having hardware processor 104 and system memory 106. As further shown in FIG. 1, system memory 106 includes video reformatting software code 110 stored therein. In addition, FIG. 1 shows communication network 130 interactively linking system 100 with principle feature identification data source 134 and client system 150, via network communication links 132. FIG. 1 also shows input video file 120, output video file 140, display 152 of client system 150, and system user 136.

It is noted that although FIG. 1 depicts system 100 as including single computing platform 102, more generally, system 100 may include one or more computing platforms, such as computer servers for example, which may be co-located, or may form an interactively linked but distributed system. For example, system 100 may be a cloud based system. As a result, hardware processor 104 and system memory 106 may correspond to distributed processor and memory resources within system 100. Thus, the features attributed to video reformatting software code 110 below by reference to FIG. 2 of the present application may be stored remotely from one another within the distributed memory resources of system 100.

According to the implementation shown by FIG. 1, system user 136 may utilize client system 150 to interact with system 100 over communication network 130. In one such implementation, as noted above, system 100 may be a cloud based system including one or more web servers, accessible over the Internet. Alternatively, system 100 may correspond to one or more computer servers supporting a local area network (LAN), or included in another type of limited distribution network. System user 136 may utilize client system 150 to interact with system 100, and to use video reformatting software code 110 to generate output video file 140 including reformatted video content based on video content included in input video file 120.

Although client system 150 is shown as a personal computer (PC) in FIG. 1, that representation is provided merely as an example. In other implementations, client system 150 may be any other suitable mobile or stationary computing device or system. For example, in other implementations, client system 150 may take the form of a laptop computer, tablet computer, digital media player, gaming console, or smartphone, for example. It is further noted that display 152 may take the form of a liquid crystal display (LCD), a light-emitting diode (LED) display, an organic light-emitting diode (OLED) display, or another suitable display screen that performs a physical transformation of signals to light.

Figure 2:
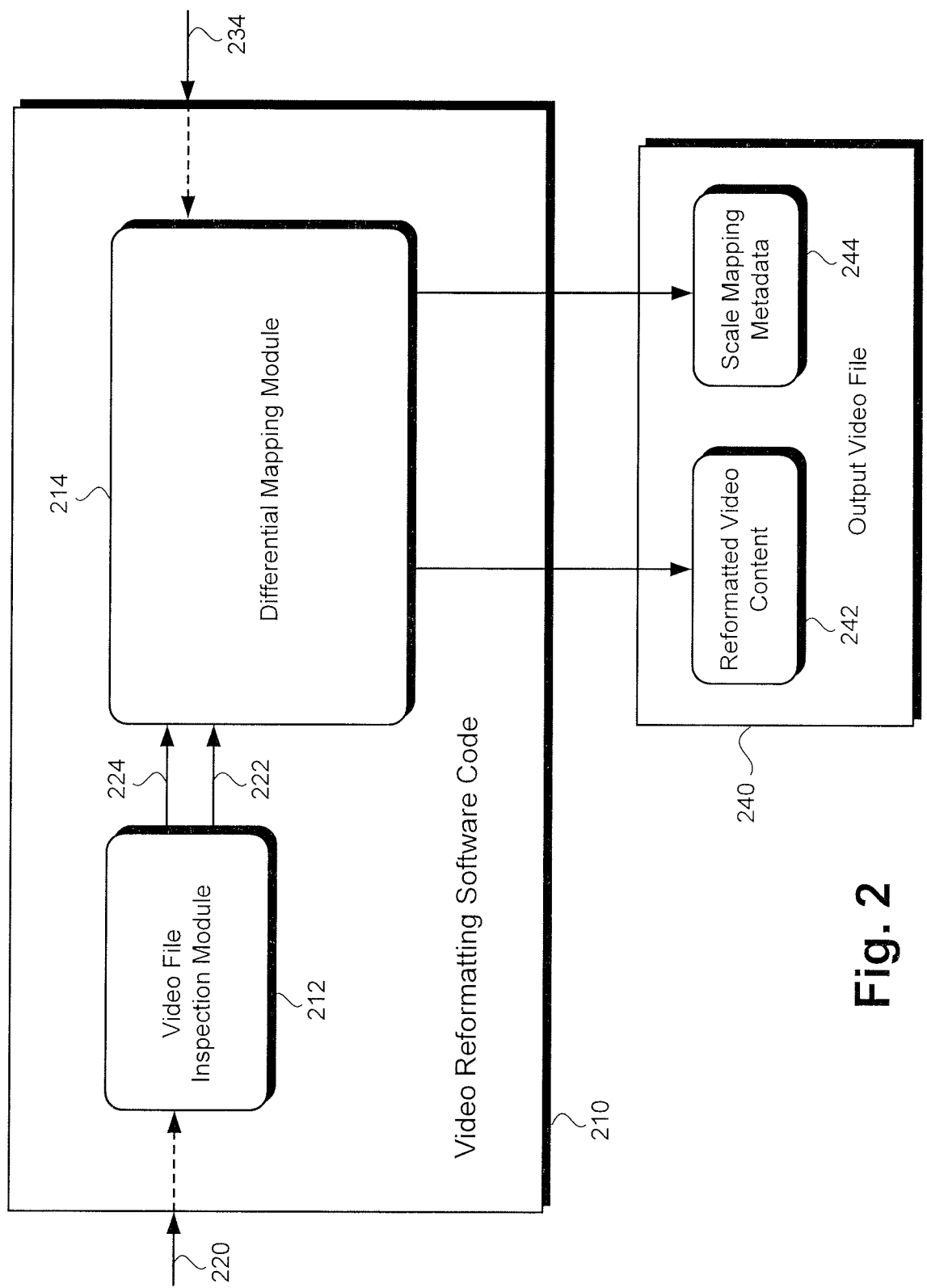
FIG. 2 shows a diagram of an exemplary video reformatting software code suitable for use by a system for differentially transforming video, according to one implementation.

FIG. 2 shows a more detailed representation of video reformatting software code 210 suitable for use in system 100 in FIG. 1, according to one exemplary implementation. As shown in FIG. 2, video reformatting software code 210 may receive input video file 220 and may generate output video file 240 including at least reformatted video content 242, and in some implementations further including scale mapping metadata 244. As further shown in FIG. 2, video reformatting software code 210 includes video file inspection module 212 for detecting one or more principle features depicted in video content 222 based on predetermined principle feature identification data 224. In addition, video reformatting software code 210 includes differential mapping module 214 for generating reformatted video content 242 and scale mapping metadata 244.

FIG. 2 also shows principle feature identification data 234 received from a principle feature identification data source, such as principle feature identification data source 134, in FIG. 1. Principle feature identification data source may be an author or producer of input video file 120/220, or may be a third party source of principle feature identification data 234, for example. Video reformatting software code 210 including video file inspection module 212 and differential mapping module 214, in FIG. 2, corresponds in general to video reformatting software code 110, in FIG. 1, and may share any of the characteristics attributed to that corresponding feature by the present disclosure. Any characteristics attributed to video reformatting software code 110 may also be attributed to video reformatting software code 210, and any characteristics attributed to video reformatting software code 210 may also be attributed to video reformatting software code 110.

Input video file 220 and output video file 240 correspond respectively in general to input video file 120 and output video file 140, in FIG. 1. Thus, like input video file 220, input video file 120 may include video content 222 and principle feature identification data 224. Moreover, like output video file 240, output video file 140 may include scale mapping metadata 244 and/or reformatted video content 242.

It is noted that, in various implementations, output video file 240, when generated using video reformatting software code 110/210, may be stored in system memory 106 and/or may be copied to non-volatile storage (not shown in FIG. 1 or 2). Alternatively, or in addition, in some implementations, output video file 240 may be sent to client system 150 for presentation on display 152, for example by being transferred via network communication links 132 of communication network 130.

Figure 3:
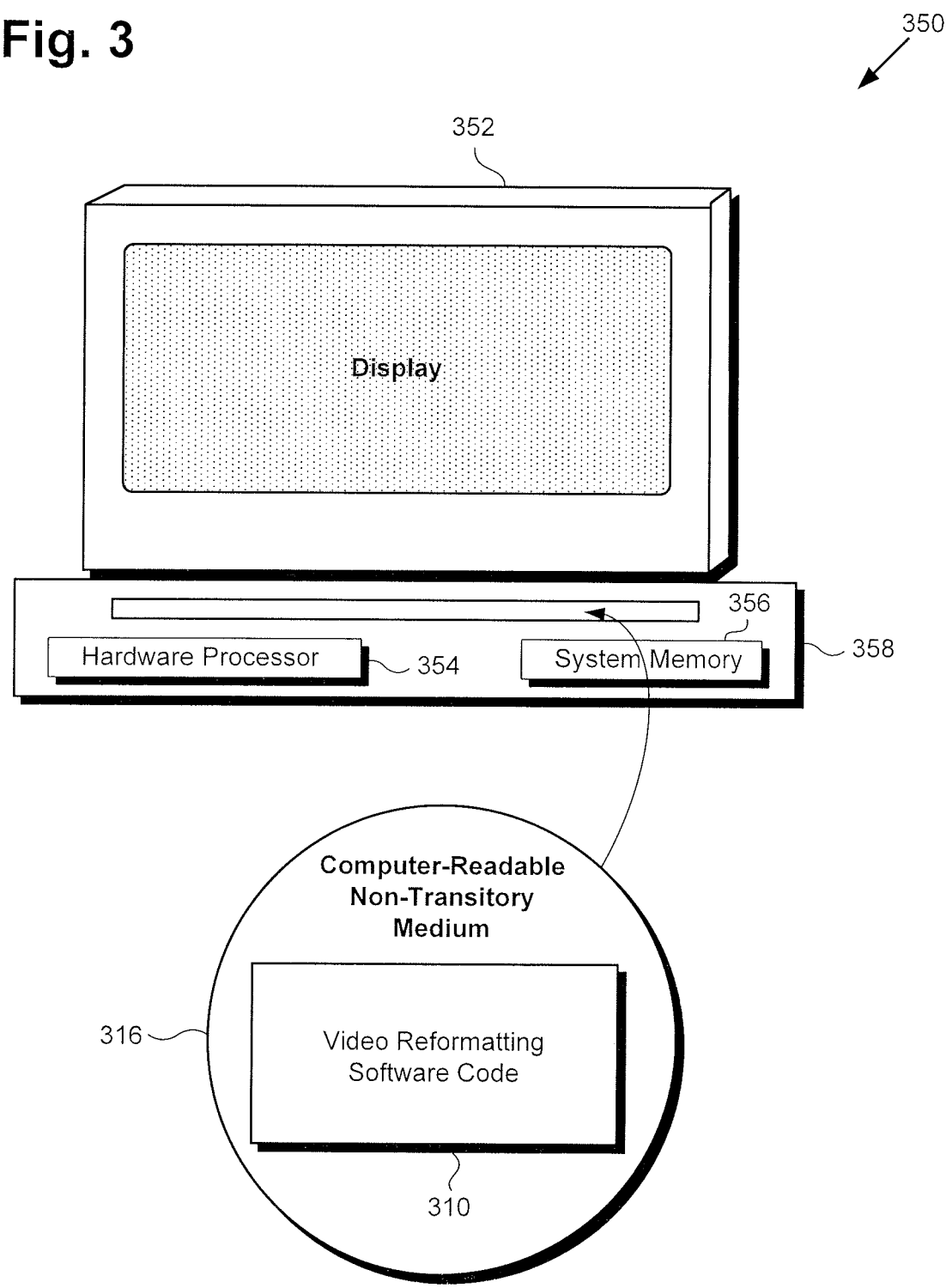
FIG. 3 shows an exemplary system and a computer-readable non-transitory medium including instructions enabling execution of a method for differentially transforming video, according to one implementation.

FIG. 3 shows exemplary system 350 and computer-readable non-transitory medium 318 including instructions enabling execution of a method for differentially transforming video, according to one implementation. System 350 includes computer 358 having hardware processor 354 and system memory 356, interactively linked to display 352. Display 352 may take the form of an LCD, LED display, OLED display, or another suitable display screen that performs a physical transformation of signals to light. System 350 including display 352 and computer 358 having hardware processor 354 and system memory 356 corresponds in general to client system 150 including display 152, in FIG. 1.

Also shown in FIG. 3 is computer-readable non-transitory medium 318 having video reformatting software code 310 stored thereon. The expression "computer-readable non-transitory medium," as used in the present application, refers to any medium, excluding a carrier wave or other transitory signal, that provides instructions to hardware processor 354 of computer 358. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides video reformatting software code 310 for execution by hardware processor 354 of computer 358. Video reformatting software code 310 corresponds in general to video reformatting software code 110/210, in FIGS. 1 and 2, and is capable of performing all of the operations attributed to those corresponding features by the present disclosure. In other words, in implementations in which hardware processor 354 of system 150/350 accesses computer-readable non-transitory medium 318 and executes video reformatting software code 310, system 150/350 may perform any of the actions attributed to system 100 by the present disclosure.

Figure 4:
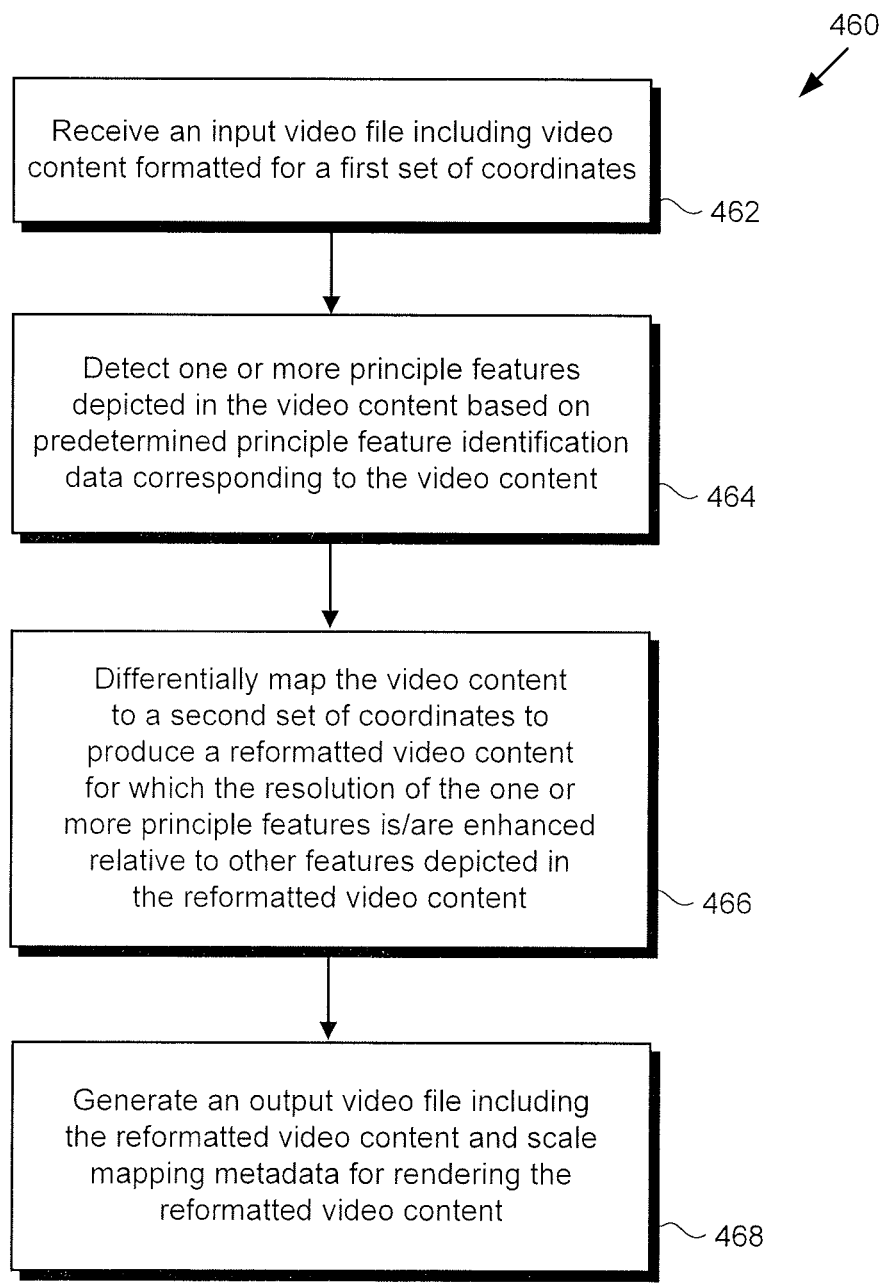
FIG. 4 shows a flowchart presenting an exemplary method for differentially transforming video, according to one implementation.
Figure 5A:
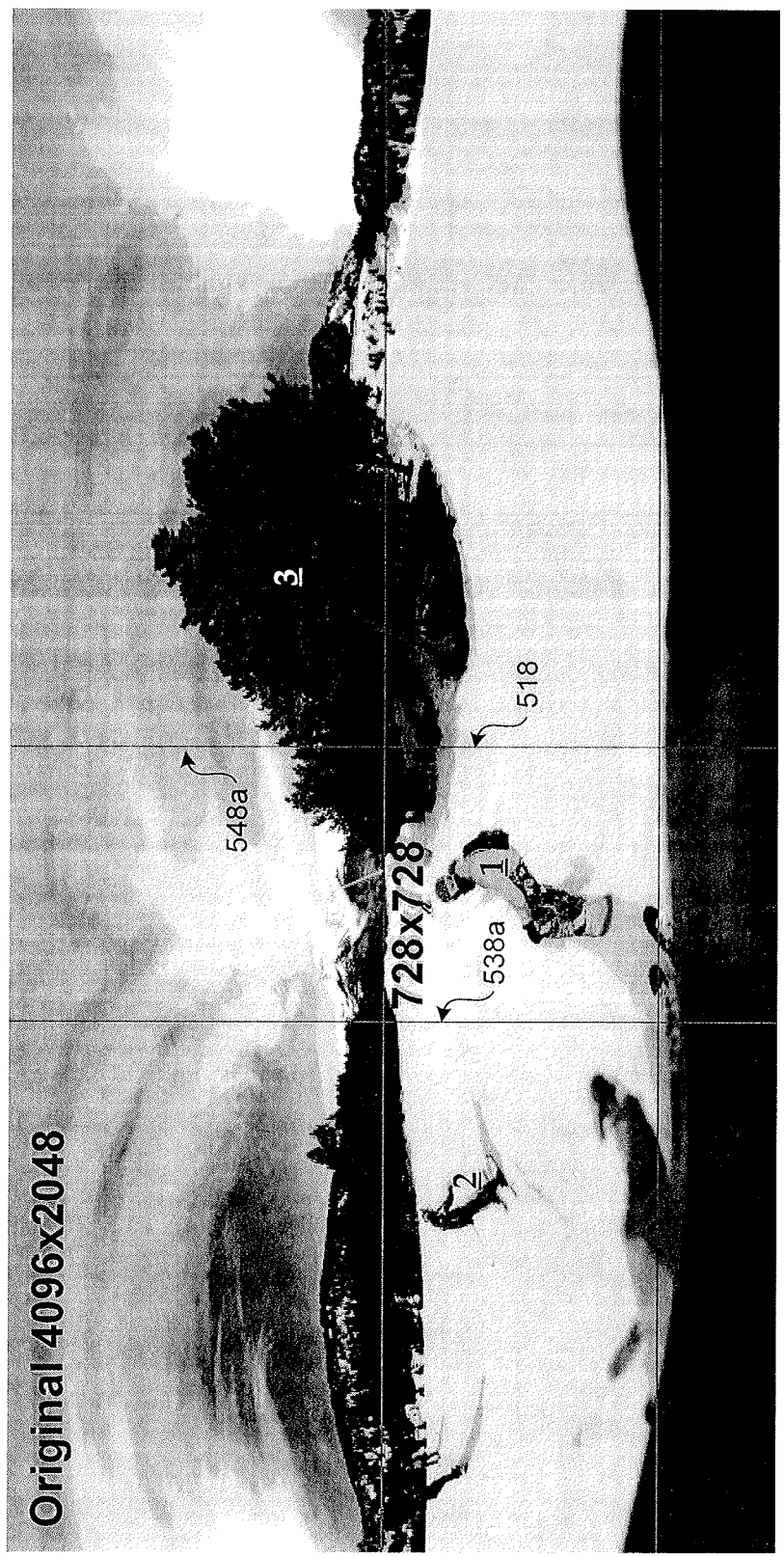
FIG. 5A shows an example of a video frame prior to differential transformation, according to one implementation.
Figure 5B:
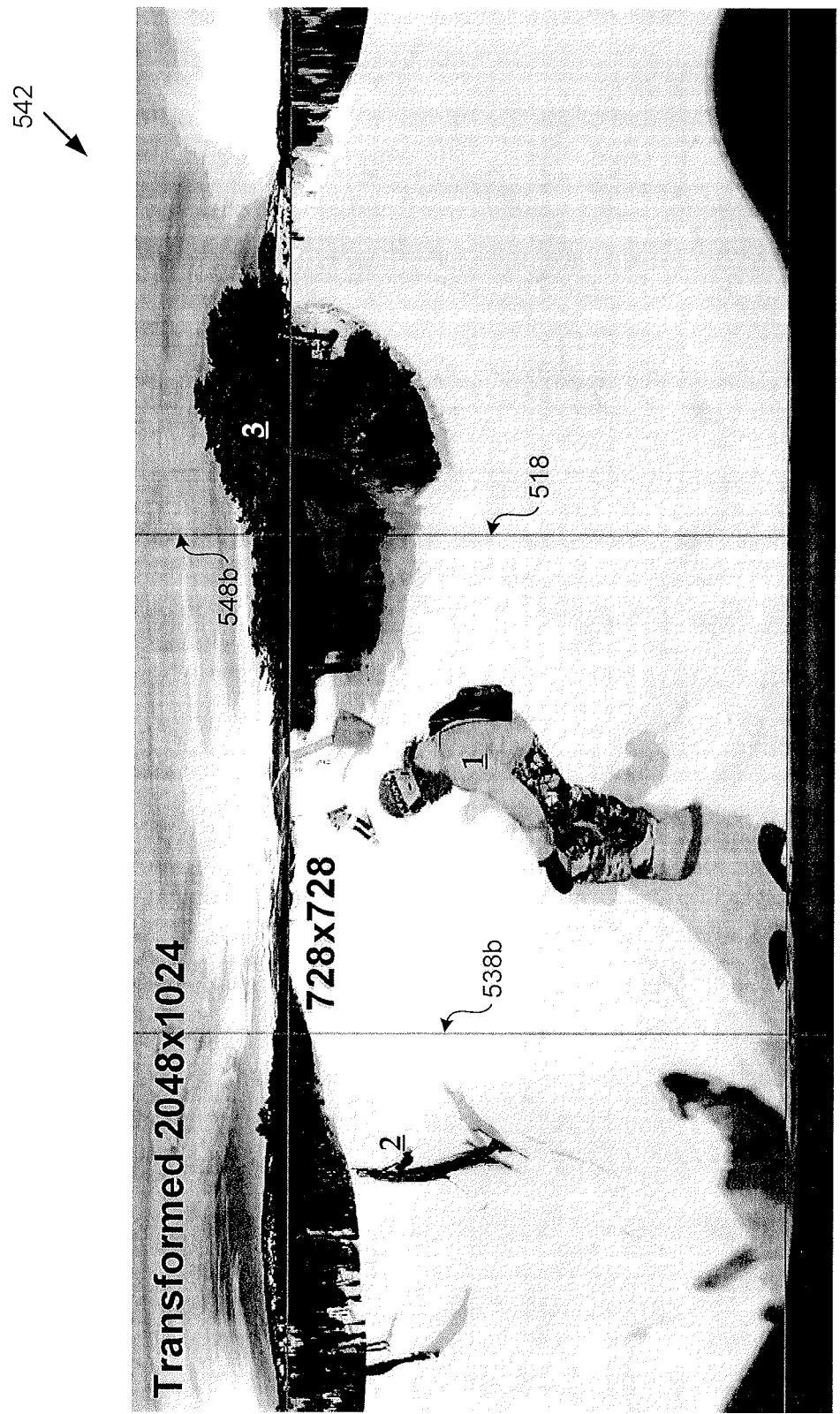
FIG. 5B shows the video frame of FIG. 5A after its differential transformation, according to one implementation.

The functionality of video reformatting software code 110/210/310 will be further described by reference to FIG. 4 in combination with FIGS. 1, 2, 3, 5A, and 5B. FIG. 4 shows flowchart 460 presenting an exemplary method for use by a system, such as system 100/150/350, for differentially transforming video. FIG. 5A shows exemplary video frame 522 of video content 222 prior to differential transformation, while FIG. 5B shows corresponding video frame 542 of reformatted video content 242 after its differential transformation, according to one implementation.

Referring now to FIG. 4 in combination with FIGS. 1 and 2, flowchart 460 begins with receiving input video file 120/220 including video content 222 formatted for a first set of coordinates (action 462). By way of example, system user 136 may transmit input video file 120/220 from client system 150 to system 100 via communication network 130 and network communication links 132. Alternatively, input video file 120/220 may be received from a third party source of video content, or may reside as a stored video file in system memory 106/356. Input video file 120/220 including video content 222 may be received by video reformatting software code 110/210/310, executed by hardware processor 104/354.

In some implementations, video content 222 of input video file 220 may be spherical video content. In those exemplary implementations, the first set of coordinates for which video content 222 is formatted may be spherical or global coordinates, such as latitudinal and longitudinal coordinates, for example. Alternatively, in other implementations, the first set of coordinates for which video content 222 is formatted may be Cartesian coordinates. It is noted that, video content 222 may be standard definition (SD), high definition (HD), or Ultra HD video content. For example, in some implementations, video content 222 may include 4K resolution video.

Flowchart 460 continues with detecting one or more principle features depicted in video content 222 based on predetermined principle feature identification data 224 and/or 234 corresponding to video content 222 (action 464). Principle feature identification data 224/234 identifies one or more features depicted in video content 222 as being a particularly important feature or features worthy of emphasis during reformatting of video content 222. For example, a principle feature of video content 222 may be a representative image of a person, person's face, animal, vehicle, or any object depicted in one or more frames of video content 222. Alternatively, a principle feature of video content 222 may be a predetermined grouping of pixels, such as an array of pixels, in one or more frames of video content 222.

As used in the present application, the phrase "predetermined principle feature identification data" refers to principle feature identification data 224 and/or 234 that is determined prior to receipt of input video file 120/220 by video reformatting software code 110/210/310. For example, the principle feature identification data may be predetermined by an author, producer, or owner of video content 222 and may be included as principle feature identification data 224 contained in input video file 120/220. Alternatively, in some implementations, input video file 120/220 may omit principle feature identification data 224. In those implementations, principle feature identification data 234 may be received separately by video reformatting software code 110/210/310 from principle feature identification data source 134, which may be an author, producer, or owner of video content 222, or may be a third party source of principle feature identification data 234.

In yet other implementations, the predetermined principle feature identification data may include principle feature identification data 224 contained by input video file 120/220, and principle feature identification data 234 received separately from input video file 120/220. In those latter implementations, for example, principle feature identification data 234 may be provided as a supplement to, or as a substitution for, principle feature identification data 224 contained in input video file 120/220.

FIG. 5A shows exemplary video frame 522 of video content 222. Exemplary video frame 522 is shown as a frame of 4K resolution video depicting single principle feature 518 as a 728×728 array of pixels including snowboarder 1. As shown by FIG. 5A, video frame 522 also depicts features 538a and 548a as respective arrays of pixels. It is noted that neither feature 538a including skier 2, nor feature 548a including trees 3 are identified as principle features of video content 222 including video frame 522. Detecting one or more principle features depicted in video content 222/522, such as principle feature 518, based on predetermined principle feature identification data 224 and/or 234 corresponding to video content 222/522 may be performed by video reformatting software code 110/210/310, executed by hardware processor 104/354, and using video file inspection module 212.

Flowchart 460 continues with differentially mapping video content 222/522 to a second set of coordinates to produce reformatted video content 242 for which the resolution of the one or more principle features are enhanced relative to other features depicted in reformatted video content 242 (action 466). In some implementations, for example, video content 222/522 in the form of spherical video content formatted for latitudinal and longitudinal spherical coordinates may be reformatted to Cartesian coordinates. In other implementations, video content 222/522 formatted for a first set of Cartesian coordinates may be reformatted to a second set of Cartesian coordinates for which one or more coordinate axes is scaled with respect to its corresponding axis in the first set of Cartesian coordinates.

According to some implementations, the differential mapping may be a cube mapping of video content 222/522 to produce reformatted video content 242. For example, in one such implementation, video content 222/522 in the form of spherical video content formatted for latitudinal and longitudinal spherical coordinates may be differentially mapped by undergoing a cube mapping to produce reformatted video content 242. Moreover, in some implementations, reformatted video content 242 may be compressed, i.e., have its resolution reduced, relative to video content 222/522. In one such implementation, for example, video content 222/522 recorded as 4K resolution video content may be reformatted and delivered to a user, such as system user 136, via a 2K resolution output video file corresponding to output video file 140/240.

Moreover, and as further shown by FIGS. 5A and 5B, in some implementations, the differential mapping may be a frame-by-frame differential mapping of video content 222/522 to reformatted video content 242/542. FIG. 5B shows exemplary reformatted video frame 542 of reformatted video content 242 after differential mapping of video frame 522. Exemplary reformatted video frame 542 is shown as a frame of 2K resolution video depicting single principle feature 518 including snowboarder 1, and also depicting features 538b and 548b after compression of video content 222/522 from 4K resolution video to 2K resolution video. Feature 538b including skier 2, and feature 548b including trees 3 correspond respectively to non-principle features 538a and 548a shown in FIG. 5A, and are shown as compressed versions of those corresponding features in FIG. 5B.

As shown by FIGS. 5A and 5B, despite the overall compression of reformatted video frame 542 relative to video frame 522, the depiction of principle feature 518 as a 728×728 pixel array is advantageously preserved in reformatted video frame 542. In other words, the resolution of principle feature 518 is enhanced in reformatted video content 242/542 relative to non-principle features 538b and 548b in reformatted video content 242/542. Differentially mapping video content 222/522 to a second set of coordinates to produce reformatted video content 242/542 for which the resolution of the one or more principle features, such as principle feature 518, are enhanced relative to other features depicted in reformatted video content 242/542 may be performed by video reformatting software code 110/210/310, executed by hardware processor 104/354, and using differential mapping module 214.

It is noted that in conventional solutions for compressing video, substantially all features depicted in the original video content may be similarly compressed, despite differences in the importance of those features. Moreover, and as noted above, conventional techniques for reformatting spherical video onto a rectangular frame results in features shown in the northernmost and southernmost latitudes of a spherical video frame being disproportionately emphasized in the reformatted rectangular frame, while equatorial features are typically underemphasized. However, and as shown by FIGS. 5A and 5B, principle feature 518 is enhanced relative to features 538b and 548b in reformatted video content 242/542, despite principle feature 518 being a relatively equatorial feature of video content 222/522.

Referring to FIG. 2, in some implementations, hardware processor 104/354 of system 100/150/350, may execute video reformatting software code 110/210/310 to provide scale mapping metadata 244 for rendering reformatted video content 242/542. For example, where one or more axes of the second set of coordinates in which reformatted video content 242/542 is projected has been scaled, e.g., elongated, compressed, curved, or rotated relative to a corresponding coordinate axis or axes of the first set of coordinates used for video content 222/522, scale mapping metadata 244 may include such scaling information.

Referring once again to flowchart 460, in FIG. 4, in some implementations, Flowchart 460 can conclude with generating output video file 140/240 including reformatted video content 242 and scale mapping metadata 244 (action 468). For example, in some implementations, output video file 140/240 may be accessible to system user 136 for rendering of reformatted video content 242 on display 152/352 of system 150/350. Generation of output video file 140/240 may be performed by video reformatting software code 110/210/310, executed by hardware processor 104/354.

Although FIG. 2 depicts scale mapping metadata 244 as being included with reformatted video content 242 in output video file 140/240, that representation is merely exemplary. In other implementations, scale mapping metadata 244 may be provided by system 100 as out-of-band metadata transmitted to system 150/350 separately from reformatted video content 242 via communication network 130 and network communication links 132.

Thus, the present application discloses a solution for differentially transforming video that enables the selective emphasis of features predetermined to be principle features of video content during its reformatting. By differentially mapping the video content so as to enhance the resolution of those principle features relative to other features shown in the reformatted video content, the present solution advantageously emphasizes features that are likely to be important to viewers, regardless of their location in the original video image.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for differentially transforming video content, the system comprising:
   a computing platform including a hardware processor and a system memory;
   a video reformatting software code stored in the system memory;
   the hardware processor configured to execute the video reformatting software code to:
      receive an input video file including a spherical video content formatted for a plurality of latitudinal and longitudinal spherical coordinates;
      detect at least one principle feature depicted in the spherical video content based on a predetermined principle feature identification data corresponding to the spherical video content; and
      differentially map the spherical video content formatted for the plurality of latitudinal and longitudinal spherical coordinates to a plurality of Cartesian coordinates to produce a reformatted video content having a lower resolution relative to the spherical video content;
      wherein the differentially mapping of the spherical video content formatted for the plurality of latitudinal and longitudinal spherical coordinates to the plurality of Cartesian coordinates emphasizes the at least one detected principle feature in the reformatted video content by having the at least one detected principle feature be at a higher resolution relative to a plurality of non-principle features in the reformatted video content while the reformatted video content has the lower resolution relative to the spherical video content.

2. The system of claim 1, wherein the hardware processor is further configured to execute the video reformatting software code to provide a scale mapping metadata for rendering the reformatted video content, wherein the scale mapping metadata provides scaling information for rendering the reformatted video content when one or more axes of the Cartesian coordinates is scaled by elongating, compressing, curving, or rotating relative to a corresponding one or more axes of the latitudinal and longitudinal spherical coordinates.

3. The system of claim 2, wherein the hardware processor is further configured to execute the video reformatting software code to generate an output video file including the reformatted video content and the scale mapping metadata.

4. The system of claim 3, wherein the spherical video content comprises 4K resolution video and the output video file is a 2K resolution video file.

5. The system of claim 1, wherein the differential mapping comprises a cube mapping of the spherical video content.

6. The system of claim 1, wherein separate from the spherical video content, the input video file further includes the predetermined principle feature identification data, and wherein the predetermined principle feature identification data identify the at least one principle feature in the spherical video content.

7. The system of claim 1, wherein prior to detecting the at least one principle feature depicted in the spherical video content, the hardware processor is further configured to execute the video reformatting software code to receive the predetermined principle feature identification data for the spherical video content, wherein the predetermined principle feature identification data identify the at least one principle feature.

8. A method for use by a system including a computing platform having a hardware processor and a system memory storing a video reformatting software code, the method comprising:
   receiving, using the hardware processor, an input video file including a spherical video content formatted for a plurality of latitudinal and longitudinal spherical coordinates;
   detecting, using the hardware processor, at least one principle feature depicted in the spherical video content based on a predetermined principle feature identification data corresponding to the spherical video content; and
   differentially mapping the spherical video content formatted for the plurality of latitudinal and longitudinal spherical coordinates to a plurality of Cartesian coordinates to produce a reformatted video content having a lower resolution relative to the spherical video content;
   wherein the differentially mapping of the spherical video content formatted for the plurality of latitudinal and longitudinal spherical coordinates to the plurality of Cartesian coordinates emphasizes the at least one detected principle feature in the reformatted video content by having the at least one detected principle feature be at a higher resolution relative to a plurality of non-principle features in the reformatted video content while the reformatted video content has the lower resolution relative to the spherical video content.

9. The method of claim 8, wherein the method further comprises providing, using the hardware processor, a scale mapping metadata for rendering the reformatted video content, wherein the scale mapping metadata provides scaling information for rendering the reformatted video content when one or more axes of the Cartesian coordinates is scaled by elongating, compressing, curving, or rotating relative to a corresponding one or more axes of the latitudinal and longitudinal spherical coordinates.

10. The method of claim 8, wherein the method further comprises generating, using the hardware processor, an output video file including the reformatted video content and the scale mapping metadata.

11. The method of claim 10, wherein the spherical video content comprises 4K resolution video and the output video file is a 2K resolution video file.

12. The method of claim 8, wherein the differential mapping comprises a cube mapping of the spherical video content.

13. The method of claim 8, wherein separate from the spherical video content, the input video file further includes the predetermined principle feature identification data, and wherein the predetermined principle feature identification data identify the at least one principle feature in the spherical video content.

14. The method of claim 8, wherein prior to detecting the at least one principle feature depicted in the spherical video content, the hardware processor is further configured to execute the video reformatting software code to receive the predetermined principle feature identification data for the spherical video content, wherein the predetermined principle feature identification data identify the at least one principle feature.

\* \* \* \* \*